3,063,953
PROCESS OF IMPROVING THE PHYSICAL CHARACTERISTICS OF AN AMINE-FORMALDEHYDE FOAM BY COMPRESSION AND PRODUCT PRODUCED THEREFROM
James J. Eberl, Moylan, and Sydney Coppick, Ridley Park, Pa., assignors to Scott Paper Company, Chester, Pa., a corporation of Pennsylvania
No Drawing. Filed Aug. 22, 1960, Ser. No. 50,872
9 Claims. (Cl. 260—2.5)

The present invention relates to the preparation of foamed aminoplast resins and more particularly to a mechanical manipulation of the lower density types of such foamed resins in order to modify certain of the physical characteristics thereof.

Low density aminoplast foams and particularly cellulated foams of urea-formaldehyde resins have been known for some time. A urea-formaldehyde prepolymer, for example, formed by condensing urea and formaldehyde in an approximate 1 to 2 molar ratio may be converted into a stable foam by addition to a cellulated mass of a surface active agent, water and an acid catalyst such as sulfuric acid. Regulation of the density of the cellulated matrix by aeration thereof enables control of the density of the resin foam within limits of from 0.2 to 0.8 pound per cubic foot. Additionally, it has been noted that the degree of aeration and matrix agitation affects the fineness of the ultimate foam which can have as many as $10^5$ cells per cubic centimeter. Upon curing and drying there is obtained a foam structure possessing a skeletal configuration composed of rod-like strands and assemblies. Melamine formaldehyde resins, and mixed melamine-urea thiourea condensation products with formaldehyde may be similarly processed to produce light-weight foams. These and other foamed resins, as well as their methods of formation, are disclosed in U.S. Patents Nos. 2,273,367, 2,384,387, 2,559,891 and 2,813,780 and British Patents Nos. 768,562 and 773,809. A more complete description of typical urea-formaldehyde resin solutions which may be employed in the production of light-weight foams is found in U.S. Patent No. 2,858,195 and Belgian Patents Nos. 565,130 and 569,190.

As is noted in the several patent disclosures, the aminoplast resin foams are extremely fragile because of their low structural strength and lack of resilience. Accordingly the utility of such materials is seriously restricted. Attempts have been made to subject the aminoplast foams to thermal compression to improve their strength characteristics and to widen their range of application but such treatment so reduces the absorptive bulk and compliability of the foams that the physical modification has been considered of little value. In other instances the composition of the resin per se has been changed but the resultant foams, while exhibiting significant improvement in softness and hydrophilicity, are still lacking in mechanical strength.

It is an object of our invention to provide a mechanical treatment of a foamed aminoplast resin whereby to enhance its softness and strength without significant alteration of its physical structure.

Another object of the present invention is the provision of an improved aminoplast resin foam possessing special resiliency and compliancy.

A further object of this invention is the provision of a mechanically induced improvement in the softness and compliance of an aminoplast resin foam without material diminution of the volume of such resin foam.

Other objects and advantages of our invention will be apparent from the following detailed description of certain preferred embodiments thereof.

Briefly stated, the present invention contemplates the intermittent application of a uniform compressive stress against opposed planar surfaces of a light-weight foamed aminoplast resin alternated with periods of relaxation to permit substantially complete recovery of the foamed body, such manipulation producing a foam of increased mechanical strength, resiliency and compliability.

We have ascertained that the ordinary foamed aminoplast resin ruptures or disintegrates when subjected to relatively low linearly applied pressures. When, however, a uniform compressive force is gradually imposed against a broad area of the resin foam, the gross foam structure remains intact even when the thickness of the foam is reduced by as much as 80%, and no observable macroscopic fissures or cracks appear therein. Furthermore, by proper control of resin composition, temperature, amount and duration of pressure applications, the compressed foam will return to its original dimensions upon release of the compressing force. Although a reasonable amount of softness and compliance may be achieved through a single compression, particularly if sustained for a considerable period of time, we have found that more significant changes in the physical properties of the aminoplast foam may be realized through the intermittent application of controlled uniform or gradually increasing compressive forces thereto. Furthermore, we have found, in the case of the low density, urea-formaldehyde resin foams, that whereas a rapid and extreme application of the compressive forces generally results in a progressive degeneration and ultimate disintegration of the structure, even the most fragile resin foams will withstand repeated compressions of short duration but of gradual increasing severity when alternated with periods of relaxation.

In order to demonstrate the principles of our invention a urea-formaldehyde foam having a density of 0.56 pound per cubic foot was produced in the following manner.

A prepolymer was prepared from a mixture of one mole of urea, two moles of paraformaldehyde (containing 5% methyl alcohol) and 0.002 mole of sodium hydroxide dissolved in water to form a 40% aqueous solution. The mixture was refluxed at 97° C. for 15 minutes and thereafter the reaction mixture was acidified to a pH of 4.5 by additions of 4 M phosphoric acid. Reflux was continued until the viscosity of a test portion, cooled to 20° C., was approximately 50 centistokes.

To prepare for foaming of this prepolymer, 52 parts by weight of the reaction mixture was combined with one part by weight of urea, 5 parts by weight of 34% Teepol 610 (a sodium secondary alkyl sulphate produced by the Shell Chemical Corporation) and 42 parts by weight of water. Two volumes of the resin solution and one volume of an acid hardening solution consisting of 2 parts of urea and 7.5 parts of 85% phosphoric acid in 90 parts of water were pumped to the mixing chamber of a foaming nozzle to which compressed air was introduced while the mixed solutions passed at high velocity along a tortuous obstacle path to produce a fine foam. This foam was collected in wire mesh containers and cured at 80° C. and 45% relative humidity in a cabinet with forced air circulation for a period of three hours.

Test blocks of this foam were subjected to compressive forces of different intensities, durations and cycles, the several experiments and observed results being set forth hereinafter.

| Ex. No. | Treatment | Bulk retention, percent | Pressure to compress to ½ thickness, gm./cm.² | Thickness reduction at a pressure of 10 gms./cm.², percent |
|---|---|---|---|---|
| 1 | Untreated | 100 | 55.0 | 0 |
| 2 | 5 times to 50% compression for 30 seconds each. | 95 | 10.5 | 45.0 |
| 3 | 6 times at 40% compression for 30 seconds each. | 97 | 16.5 | 27.0 |
| 4 | 6 times at 65% compression for 30 seconds each. | 95 | 12.5 | 35.5 |
| 5 | 1 time at 50% compression for 30 seconds. | 99 | 31.0 | 6.0 |
| 6 | 2 times at 50% compression for 30 seconds each. | 96 | 28.0 | 12.0 |
| 7 | 3 times at 50% compression for 30 seconds each. | 96 | 26.0 | 20.0 |
| 8 | 4 times at 50% compression for 30 seconds each. | 96 | 22.0 | 24.0 |
| 9 | 5 times at 50% compression for 30 seconds each. | 96 | 21.0 | 30.5 |
| 10 | 1 time at 50% compression for 10 seconds. | 99 | 42.0 | 4.0 |
| 11 | 2 times at 50% compression for 10 seconds each. | 96 | 36.0 | 16.0 |
| 12 | 1 time to 30% compression for 15 seconds. | 99 | 46.0 | 1.5 |
| 13 | 1 time to 30% compression for 15 seconds, 1 time to 50% compression for 15 seconds. | 99 | 40.5 | 7.5 |
| 14 | 1 time to 30% compression for 15 seconds, 1 time to 50% compression for 15 seconds, 1 time to 65% compression for 15 seconds. | 96.5 | 27.5 | 11.0 |
| 15 | 1 time to 30% compression for 15 seconds, 1 time to 50% compression for 15 seconds, 1 time to 65% compression for 15 seconds, 1 time to 80% compression for 15 seconds. | 96 | 20.0 | 18.0 |
| 16 | 1 time to 30% compression for 15 seconds, 1 time to 50% compression for 15 seconds, 1 time to 65% compression for 15 seconds, 2 times to 80% compression for 15 seconds. | 96 | 17.5 | 21.0 |
| 17 | 1 time to 30% compression for 15 seconds, 1 time to 50% compression for 15 seconds, 1 time to 65% compression for 15 seconds, 7 times to 80% compression for 15 seconds. | 96 | 13.5 | 36.0 |
| 18 | 1 time to 80% compression for 5 seconds. | 98.5 | 26.4 | 15.0 |
| 19 | 6 times to 80% compression for 5 seconds. | 97.1 | 17.5 | 29.0 |
| 20 | 11 times to 80% compression for 5 seconds. | 97.1 | 17.0 | 31.0 |
| 21 | 31 times to 80% compression for 5 seconds. | 94.1 | 11.5 | 35.0 |
| 22 | 1 time to 75% compression for 1 second. | 99.0 | 26.5 | 15.5 |
| 23 | 5 times to 75% compression for 1 second. | 96.4 | 15.5 | 24.5 |
| 24 | 10 times to 75% compression for 1 second. | 96.4 | 13.5 | 31.5 |
| 25 | 25 times to 75% compression for 1 second. | 94.7 | 10.5 | 42.5 |

In the foregoing examples the percentage compression is defined as the percentage reduction in thickness imposed upon the sample while the time in seconds includes the time expended in attaining the defined compression. The bulk retention is the percentage of the original volume to which the sample returns upon completion of the treatment.

The softness and compliance properties of the treated material are described by alternate methods. The second column in the above table presents the so-called constant deformation test, that is, the pressure required to reduce the thickness of the treated product to 50% of its original thickness. The results reported demonstrate the ease with which the treated product may be deformed. The third column reports the results of a constant load deformation test, setting out the comparative percentages of thickness reduction in the treated material when subjected to a pressure of 10 grams per centimeter squared or approximately 3 ounces per square inch of material.

It is apparent from the foregoing results that the compression deformable characteristics of a foamed urea-formaldehyde resin are markedly altered by the mechanical manipulation contemplated by our invention. It is further apparent that there is a wide range of combinations of operating conditions such as degree of compression, retention time under compression and number of compression-relaxation cycles which will enable attainment of the desired modification of physical properties of the treated foam.

The above results were obtained under the standard atmospheric conditions of humidity and temperature.

By increasing the mechanical strength of the resin foams as contemplated by our invention, these lightweight materials are adapted for use as the absorbent filling media of surgical and catamenial pads wherein compliance and resilience are highly desirable characteristics supplementing the fluid retention capacity of the foam substance.

What we claim is:

1. The process of improving the physical characteristics of a low-density amine-formaldehyde resin foam which comprises exerting at atmospheric temperature and humidity a uniform compressive force against said foam to reduce the volume thereof without material destruction and subsequently relaxing said compressive force to permit substantially complete recovery of the foamed body.

2. The process of improving the physical characteristics of a low-density amine-formaldehyde resin foam which comprises exerting intermittently at atmospheric temperature and humidity a uniform compressive force against said foam to reduce the volume thereof and alternately relaxing said compressive force to permit substantially complete recovery of the foamed body.

3. The process of claim 2 in which the aminoplast resin is a urea-formaldehyde resin.

4. The process of improving the physical characteristics of a low density amine-formaldehyde resin foam which comprises exerting intermittently at atmospheric temperature and humidity a uniform compressive force against said foam to reduce the volume thereof without destructive impact upon the foam structure and alternately relaxing said compressive force to permit substantially complete recovery of the foamed body, each succeeding application of force being of increasing magnitude.

5. The process of claim 4 in which the foam is of a ureaformaldehyde resin.

6. The process of improving the physical characteristics of a low-density amine-formaldehyde resin foam which comprises exerting intermittently at atmospheric temperature and humidity a uniform compressive force against said foam to reduce the volume thereof without destructive impact upon the foam structure and alternately relaxing said compressive force to permit substantially complete recovery of the foamed body, each application of force being sustained for a time sufficient to admit of material adjustment under compressive loading and each succeeding application of force being of greater magnitude than its immediate predecessor.

7. The process as defined in claim 6 in which each application of force is of identical magnitude.

8. A modified amine-formaldehyde resin foam produced by the process defined in claim 1.

9. A modified amine-formaldehyde resin foam produced by the process defined in claim 6.

References Cited in the file of this patent

UNITED STATES PATENTS 2,384,387    Meyer    Sept. 4, 1945
2,933,767    Vieli et al.    Apr. 26, 1960